(12) United States Patent  
Hirata et al.

(10) Patent No.: US 8,781,621 B2  
(45) Date of Patent: Jul. 15, 2014

(54) MOVING CARTRIDGES BETWEEN LIBRARY STRINGS

(71) Applicant: International Business Machines Corporation, Armonk, NY (US)

(72) Inventors: Takamasa Hirata, Tokyo (JP); Naoki Imai, Tokyo (JP); Norie Iwasaki, Tokyo (JP); Masanori Kamiya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/947,009

(22) Filed: Jul. 19, 2013

(65) Prior Publication Data

US 2014/0031973 A1   Jan. 30, 2014

(30) Foreign Application Priority Data

Jul. 25, 2012   (JP) ................................ 2012-165054

(51) Int. Cl.
  *G06F 7/00*   (2006.01)
(52) U.S. Cl.
  USPC ........... 700/218; 700/219; 700/220; 700/221; 700/222; 700/228
(58) Field of Classification Search
  None
  See application file for complete search history.

(56) References Cited

U.S. PATENT DOCUMENTS 5,646,918 A * 7/1997 Dimitri et al. ............. 369/30.31
2013/0007302 A1 * 1/2013 Alatorre et al. .................. 710/5

OTHER PUBLICATIONS

Machine Translation of JP2001-109590, published Apr. 20, 2001, pp. 1-19.
Machine Translation of JP05-307820, published Nov. 19, 1993, pp. 1-9.

* cited by examiner

*Primary Examiner* — Yolanda Cumbess
(74) *Attorney, Agent, or Firm* — William K. Konrad; Konrad, Raynes, Davda and Victor LLP

(57) ABSTRACT

The present description is directed to moving a cartridge including a storage medium between library strings (LS) using a car able to move within a shuttle connection in a shuffle complex system in which, in one embodiment, a first cartridge is to be moved from a first LS to a second LS, a car located in the LS nearest to the first LS due to movement of a second cartridge is used to move the second cartridge to the first LS , and the empty car is used to move the first cartridge from the first LS to the second LS. In one aspect, movement of empty cars may be reduced, and cartridges may be moved between library strings more efficiently in less time. Other features and aspects are described.

24 Claims, 7 Drawing Sheets

MOVING CARTRIDGES BETWEEN LIBRARY STRINGS

RELATED APPLICATION

This application claims priority benefits under Title 35, United States Code, Section 119(a)-(d) from Japan application Serial Number JP 2012-165054, filed Jul. 25, 2012, entitled "Method For Moving Cartridges Between Library Strings", and is incorporated by reference in its entirety.

TECHNICAL FIELD

The present invention relates to moving cartridges between library strings and, more specifically, to moving cartridges including a storage medium between library strings more efficiently.

BACKGROUND ART

A shuttle complex has been proposed for libraries in which a plurality of library strings connecting a plurality of libraries with storage media such as tapes are arranged in rows, and the library strings are connected by shuttle connections. This shuttle complex is already in practical use (IBM System Storage TS3500, etc.). In this shuttle complex, cars able to move within a shuttle connection move cartridges including storage media such as tapes between library strings, and the cartridges are mounted in a drive or stored in a slot within the library frame specified as the destination point.

In methods of the prior art for moving cartridges between library strings, when there is no car in the library string at the departure point, an available (empty) car has to be moved from the closest library string before the cartridge can be loaded into the car and moved to the library string at the destination point.

However, in the moving methods of the prior art, when there is no car in the library string at the departure point, an empty car not carrying a cartridge has to be moved beforehand to the library string at the departure point. Therefore, the time required to move cartridges between library strings is extended to include the movement of empty cars, and the amount of time required to move empty cars increases as both the traveling distances of cartridges and the number of traveling runs increases.

SUMMARY OF THE DESCRIPTION

In one aspect of the present description, it is believed that cartridges may be moved between library strings in a library shuttle complex more efficiently and in less time.

In one embodiment of the present description, a library manager moves a cartridge including a storage medium between library strings using a car able to move within a shuttle connection in a shuffle complex system having a plurality of library strings connected by at least one shuttle connection. In one embodiment, operations include: (a) receiving a plurality of commands from an application to move a cartridge between library strings; (b) selecting a first command among the plurality of commands to move a first cartridge from a first library string to a second library string among a plurality of library strings; (c) searching for an available car among the cars in the shuttle connection; (d) searching for the presence of at least one second command among the plurality of commands to move a second cartridge to the first library string from another library string including the second library string in which an available car is located; (e) selecting, when at least one second command has been found, a second command to move the second cartridge from the library string nearest to the first library string, and executing the moving process corresponding to the second command using the car located in the nearest library string; and (f) executing, as a result of the moving process, the moving process corresponding to the first command using a car which has reached the location of the first library string.

In one aspect of the present description, when a first cartridge is to be moved from a first library string to another or second library string, a car located in the library string nearest the first library string is used to execute the process of moving the second cartridge to the first library string, and the empty car is then used to execute the process of moving the first cartridge from the first library string to the second library string. In this way, movement of empty cars can be reduced, and cartridges can be moved between library strings more efficiently (in less time).

In another aspect of the present description, cartridges move between library strings in the manner described above except that, instead of operations (e) and (f) described above, the operations include the operations of: (e) selecting, when at least one second command has been found, a second command to move the second cartridge from the library string nearest to the first library string, and moving the second cartridge to the first library string using the car located in the nearest library string; (f) executing the moving process corresponding to the first command using the car moved to the location of the first library string; and (g) moving the second cartridge moved to the first library string to the specified location in the first library string.

In these operations, when a first cartridge is to be moved from a first library string to another or second library string, a car located in the library string nearest the first library string is used to move the second cartridge to the first library string, the empty car is then used to move the first cartridge from the first library string to the second library string, and the second cartridge moved to the first library string is then moved to the specified location in the first library string. In this way, movement of empty cars can be reduced, and cartridges can be moved between library strings more efficiently (in less time), even when the execution order of commands for moving cartridge between library strings cannot be changed.

DETAILED DESCRIPTION

Figure 1:
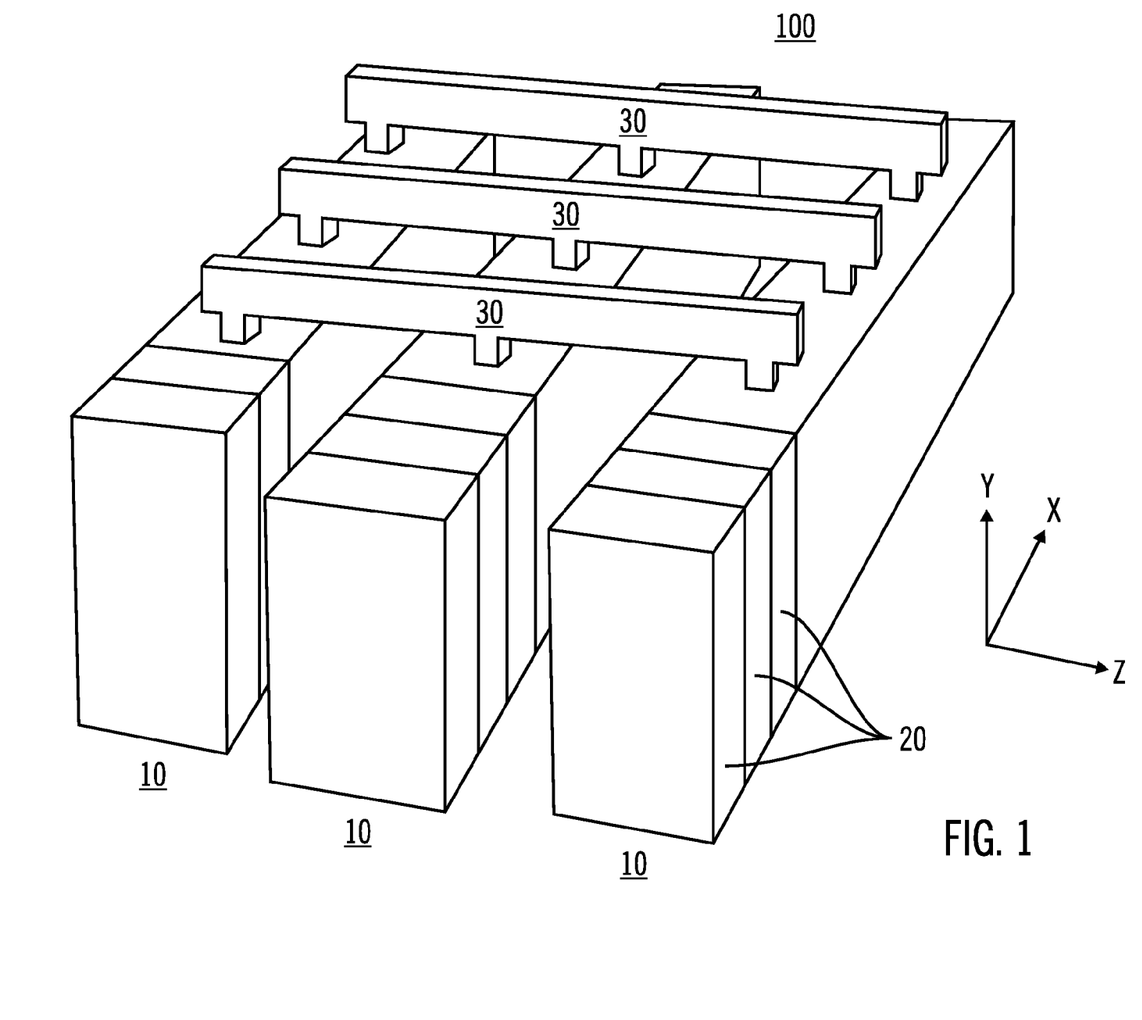
FIG. 1 is a diagram showing the external appearance of the shuttle complex of the present invention.

The following is an embodiment of the present description with reference to the drawings. FIG. 1 is a diagram showing the external appearance of the shuttle complex of the present invention. In FIG. 1, the shuttle complex 100 includes three library strings 10, and three shuttle connections 30 arranged on top of the three library strings 10. Each of the library strings 10 includes a plurality of library frames 20 connected in rows in the X direction.

The number of library strings 10 is not limited to three. Any number of library strings can be chosen. The number of shuttle connections 30 is also not limited to three. Any number can be chosen based on the length of the library strings 10 in the X direction. The length of the shuttle connections 30 in the Z direction can be extended as the number of library strings 10 is increased. Cars which move along rails are arranged inside the shuttle connections 30, and cartridges are moved inside and outside of the library strings 10 as the car stops at each position in the library strings 10.

Figure 2A:
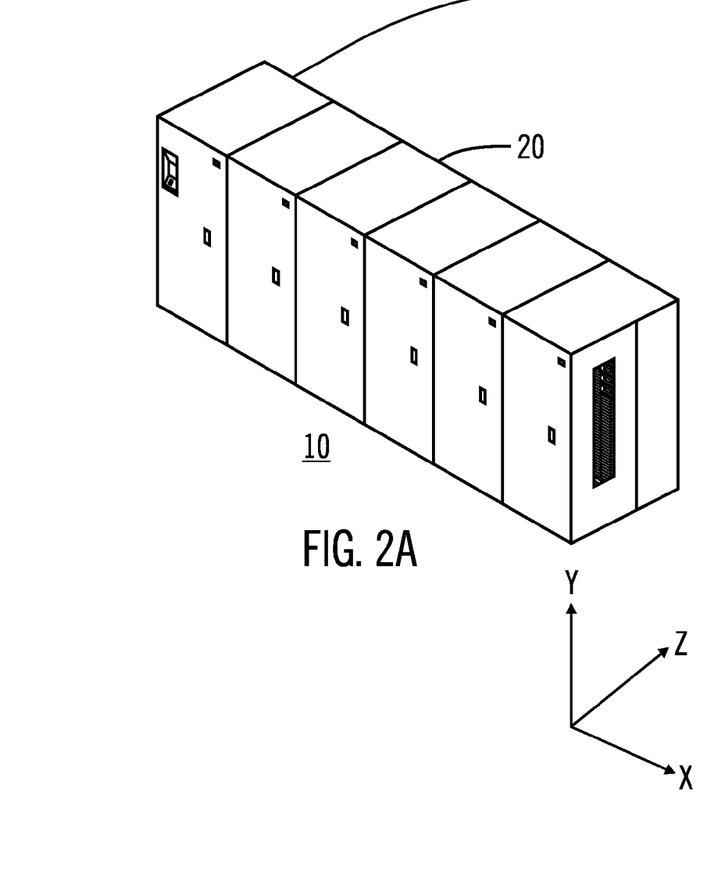
FIG. 2 is a diagram showing an example of library frames constituting a library string of the present invention.
Figure 2B:
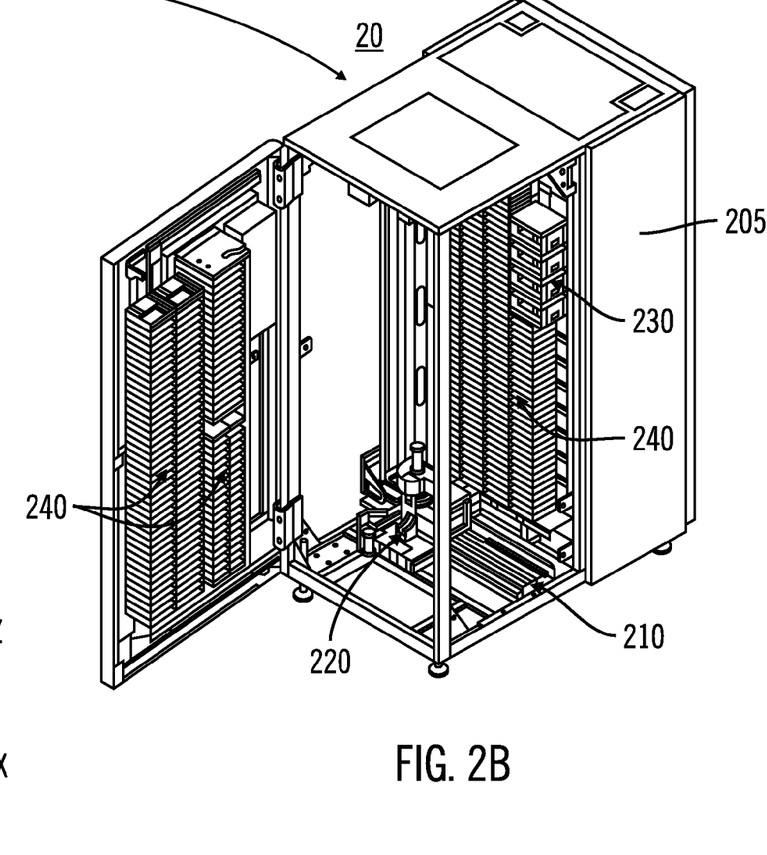

FIG. 2 is a diagram showing an example of library frames 20 constituting a library string 10 of the present invention. FIG. 2 (a) is an example of a library string 10. The library string 10 includes six connected library frames 20. FIG. 2 (b) is an enlarged view of a single library frame 20. The library frame 20 includes, in a housing 205, a robotic arm 220 able to move over a rail 210 in the X direction and over a rail in the Y direction (not shown), a plurality of drives 230 for mounting cartridges including storage media to retrieve data, and a plurality of slots 240 able to accommodate cartridges.

The rail 210 in the X direction is connected to the rail inside the adjacent library frames 20, and the robotic arm 220 is able to move through six connected library frames 20. The robotic arm 220 can hold a cartridge, move at high speed along the rail, and mount the cartridge in the specified drive 230 or slot 240. Any number of drives 230 can be chosen and arranged according to the type of storage medium (magnetic tape, magneto-optical medium, etc.) and the type of cartridge (magnetic tape 3592, LTO, etc.).

Figure 3:
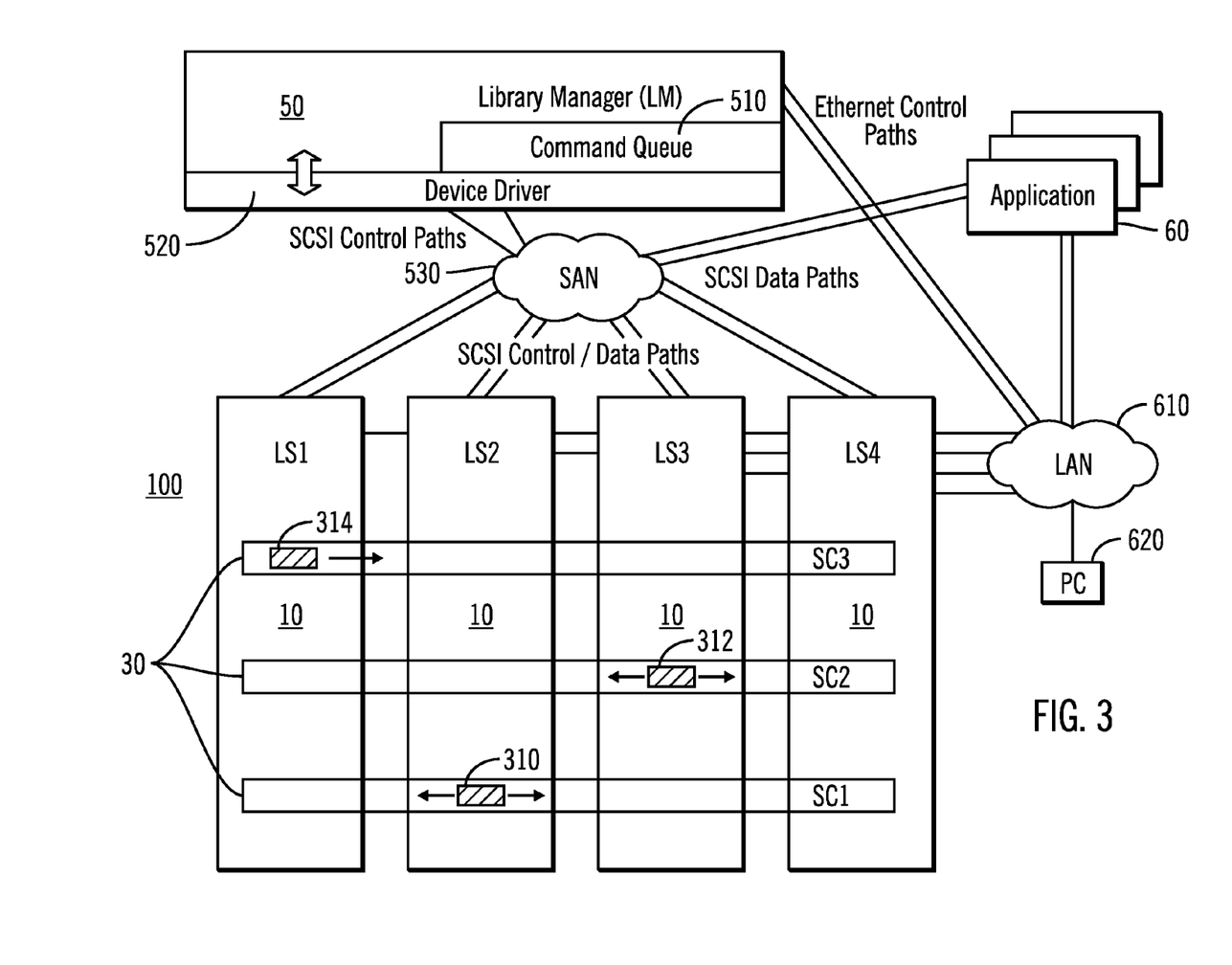
FIG. 3 is a diagram showing a configuration example of a system including a shuttle complex of the present invention.

FIG. 3 is a diagram showing a configuration example of a system including a shuttle complex 100 of the present invention. The shuttle complex 100 includes four library strings 10 (LS1-LS4). Three shuttle connections 30 (SC1-SC3) are connected to each library string. A car 310, 312, 314 is provided in each shuttle connection 30 which moves inside the shuttle connection. Each library string 10 and shuttle connection 30 is controlled by a library manager 50 via a storage area network (SAN) 530. The library strings 10 exchange (read/write) data with an application 60 via the SAN 530. The library strings 10 are also able to communicate with the application 60 and each terminal or personal computer (PC) 620 via a local area network (LAN) 610. The application 60 is dedicated software used to mount library cartridges into drives and exchange data. An example is the IBM Tivoli Storage Manager.

The library manager 50 is a single software package performing virtual central control of the drives 230 and cartridges between the application 60 and each library string. An example of a library manager 50 is IBM Tape System Library Manager (TSLM). The library manager 50 temporarily stores commands from the application 60 in a command queue 510, while controlling device drivers, and outputting, for example, an Small Computer System Interface (SCSI) command for each command to the library strings. The library manager 50 can also be a single software package or single appliance outside of the library, as shown in the drawing, or firmware inside the library.

In a configuration incorporating a library manager 50, the application 60 need only issue a request to a library manager 50 when a library including a cartridge is to be used, and the library manager 50 can manage and allocate the actual cartridges. In this way, it is easier to share cartridges in a library and, because the library manager 50 manages all operations, each application does not have to be aware of the changes each and every time the configuration is changed to add or remove libraries.

Figure 4:
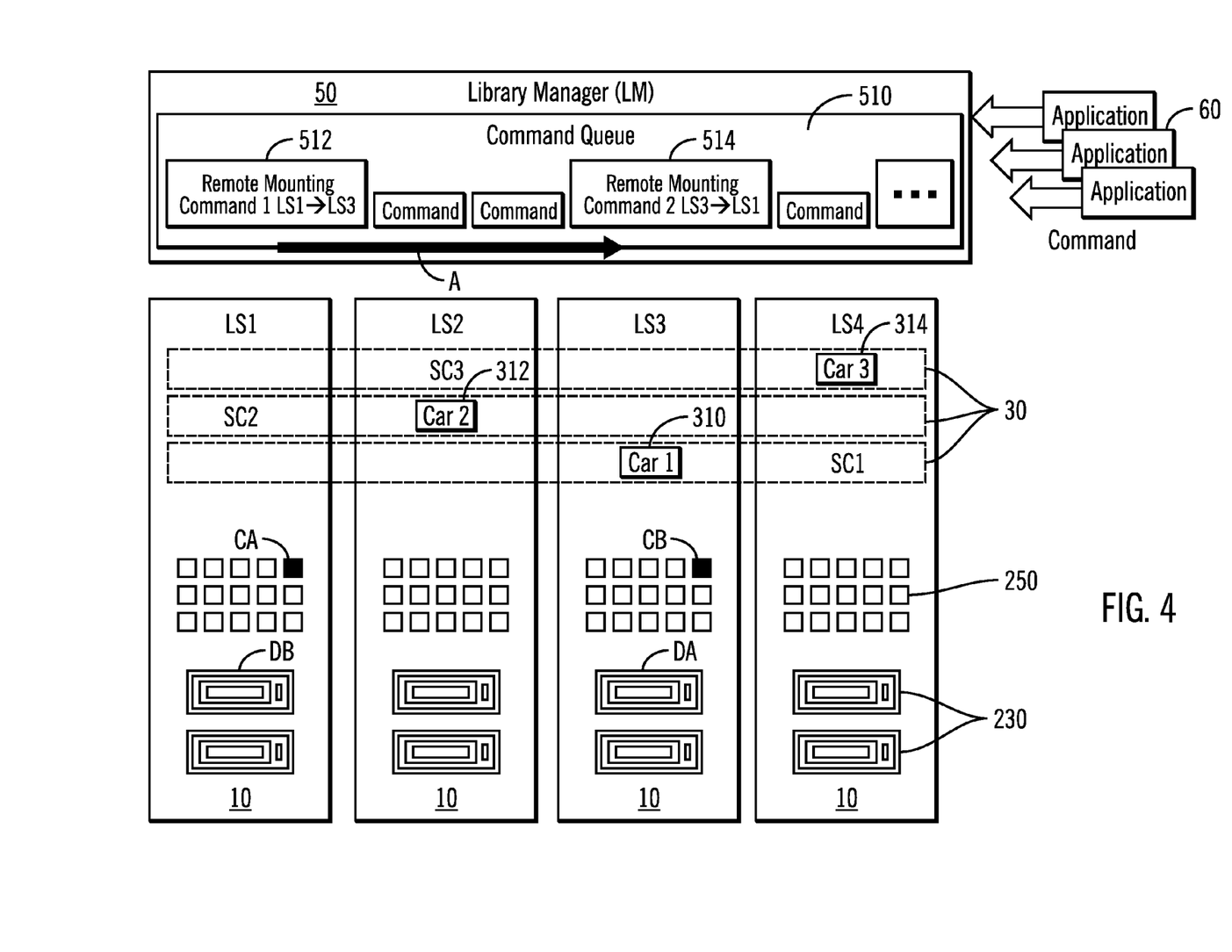
FIG. 4 is a diagram used to explain cartridge moving in accordance with one embodiment of the present description.

The following is an explanation with reference to FIG. 4 through FIG. 7 of a cartridge moving method of the present invention using the system configuration shown in FIG. 3. FIG. 4 is referred to first. In FIG. 4, the library manager 50 receives remote mounting command 1 (LS1→LS3) 512 and remote mounting command 2 (LS3-LS1) 514 as commands from the application 60, and these commands are placed in the command queue 510. Usually commands in the command queue 510 are executed in the order received, so remote mounting command 2 (LS3→LS1) 514 would be executed after remote mounting command 1 (LS1→LS3) 512 has been executed. However, in accordance with the present description, the order may be changed as described below.

Car 1 (310), car 2 (312) and car 3 (314) in the shuttle connections 30 are positioned, respectively, in LS3, LS2 and LS4 among the library strings 10. The drives 230 are the plurality of drives in each library string 10 and, more specifically, in each library frame 20. Here, reference sign 250 refers to the cartridges accommodated in slots 240 inside library strings 10 and, more specifically, inside library frames 20. The following is executed based on these premises (states).

(a) An available car is searched out in all shuttle connections connecting library strings LS1 and LS3. As a result, car 1 (310), car 2 (312) and car 4 (314) are found.

(b) The library manager 50 scans the command queue 510 in the order indicated by arrow A, and determines whether or not there is a remote mounting command to LS1 which is the departure point in remote mounting command 1 (LS1→LS3) 512. As a result, it finds remote mounting command 2 (LS3→LS1) 514.

Figure 5:
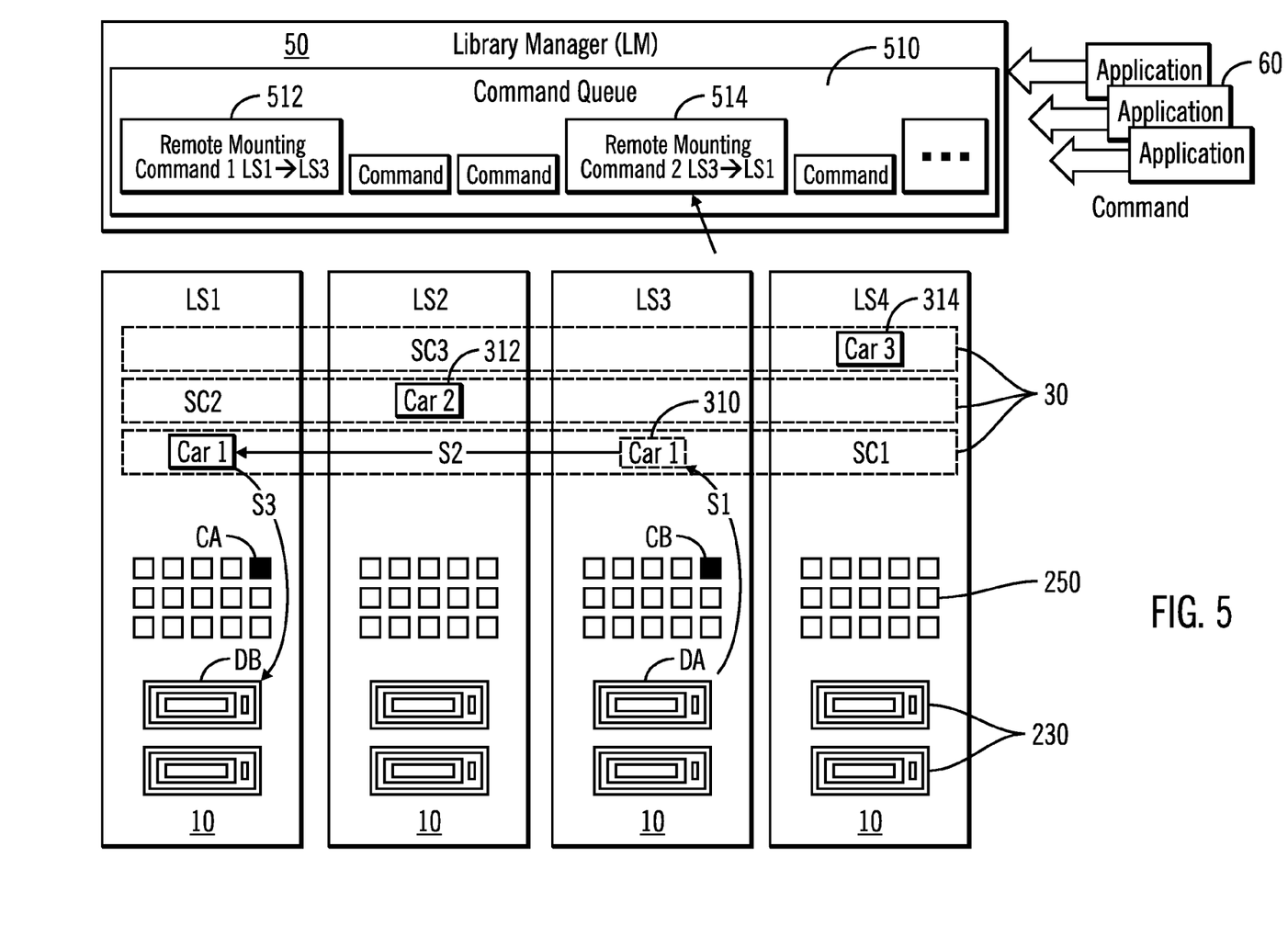
FIG. 5 is a diagram used to explain cartridge moving method in accordance with one embodiment of the present description.

FIG. 5 is now referenced.

(c) Car 1 (310) is selected, and remote mounting command 2 (LS3→LS1) 514 is executed first. In other words, a cartridge CB in LS3 is moved into car 1 (310) (operation S1), and the car 1 (310) carrying the cartridge CB is moved to LS1 (operation S2). When the arrival of car 1 (310) at LS1 is detected, the cartridge CB is moved from car 1 to the specified drive DB (operation S3).

Figure 6:
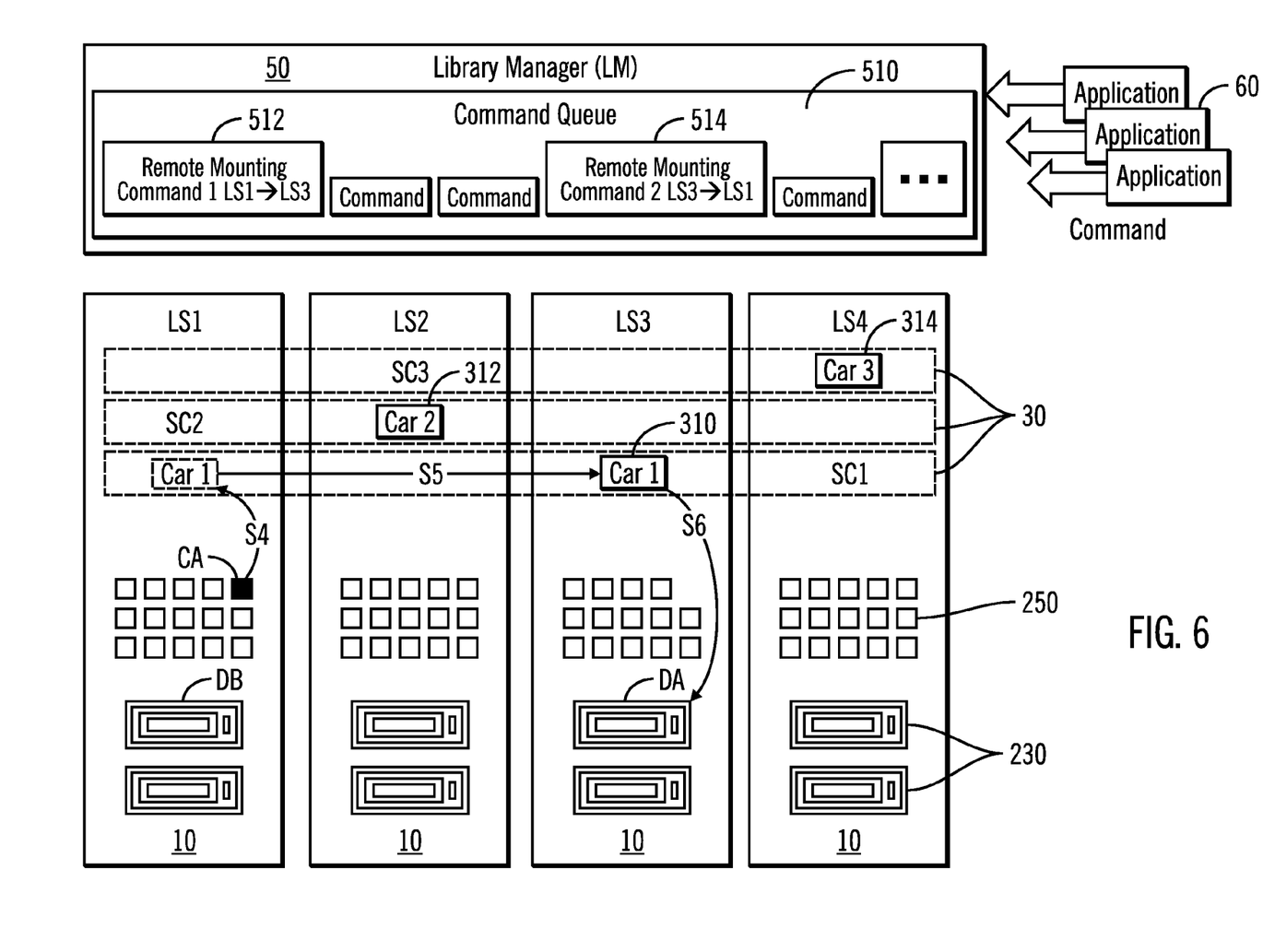
FIG. 6 is a diagram used to explain cartridge moving in accordance with one embodiment of the present description.

FIG. 6 is now referenced.

(d) Remote mounting command 1 is then executed. Because car 1 (310) has already arrived at LS1, the specified cartridge CA is moved into car 1 (operation S4), and the car 1 (310) carrying cartridge CA is moved to LS3 (operation S5).

(e) When the arrival of car 1 (310) at LS3 is detected, the cartridge CA is moved from car 1 (310) to the specified drive DA (operation S6).

These operations can eliminate (or reduce) empty cars traveling between library strings.

The average time required to mount a cartridge in a drive or slot within a library string and between library strings is 8.6 seconds and 37.6 seconds, respectively. In the case of the latter, cars need to travel between library strings, so the time required to move a car between library strings is (37.6−8.6×2)/2=10.2 seconds. Therefore, the total execution times for the two remote mounting commands when the process of the present description is used and when the process of the present description is not used are as follows:

27.4×2=54.8 seconds when the process of the present description is used (only one trip in the Z direction); and (ii) 37.6×2=75.2 seconds when the process of the present description is not used (two trips in the Z direction).

A car using the process of the present description takes 20.4 seconds less to make two trips between library strings.

The average values are experimental values obtained between adjacent library strings. The effect of operations in accordance with the present description is even greater when the distance in the Z direction is longer and the time required for a car to travel this distance is greater.

Figure 7:
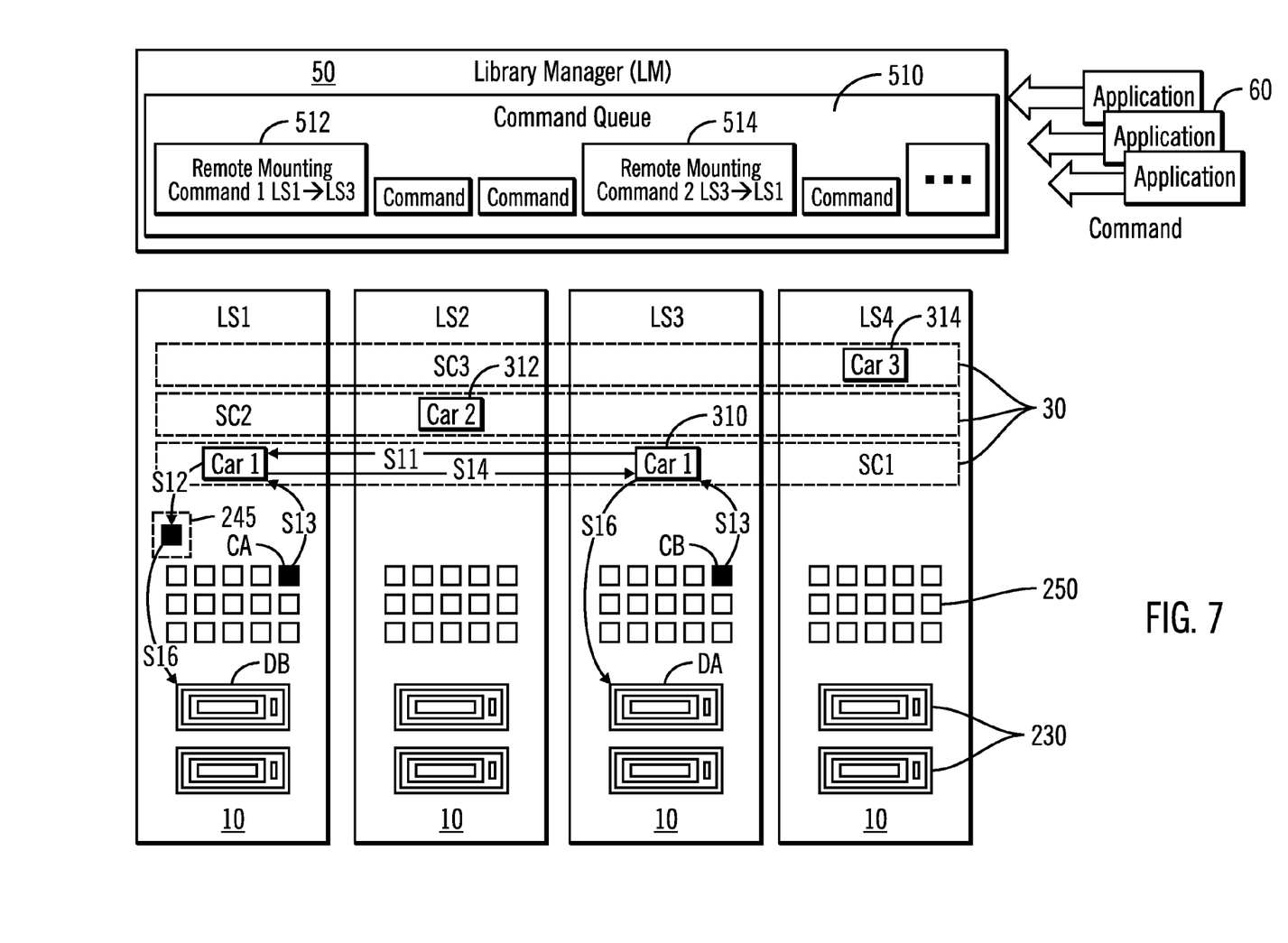
FIG. 7 is a diagram used to explain cartridge moving in accordance with one embodiment of the present description.

The following is an explanation of another cartridge moving process in accordance with the present description with reference to FIG. 7. In the process described with reference to FIG. 5 and FIG. 6, the command execution order can be changed. In the process described with reference to FIG. 7, the command execution order cannot be changed. Here, after a cartridge has been moved to LS1 by remote mounting command 2, there is a shift to a local mounting command, and the cartridge in LS1 is mounted when its turn comes up. More specifically, the following operations are executed instead of the operations in (c) through (d) described above.

(c1) Car 1 (310) is selected, cartridge CB in LS3 is moved into car 1 (310) (operation S10), and the car 1 (310) carrying the cartridge CB is moved to LS1 (operation S11). When the arrival of car 1 (310) at LS1 is detected, the cartridge CB is moved from car 1 into an empty slot 245 (operation S12).

(c2) Remote mounting command 2 itself is rewritten (turned into a local mounting command) to move the cartridge from slot 245 into drive DB.

(d1) Remote mounting command 1 is then executed. Because car 1 (310) has already arrived at LS1, the specified cartridge CA is moved into car 1 (S13), and the car 1 (310) carrying cartridge CA is moved to LS3 (operation S14).

(e1) When the arrival of car 1 (310) at LS3 is detected, the cartridge CA is moved from car 1 (310) to the specified drive DA (operation S15).

(f) When its turn comes up, the remote mounting command 2 in (c2) is changed to the local mounting command, and this command is executed to move cartridge CB from slot 245 and into drive DB (operation S16). Here, there is no need to move between library strings (in the Z direction).

In the examples described above, cartridges were mounted in drives. However, the addresses can be slots rather than drives when cartridges are moved between slots. Needless to say, cartridge moving in accordance with the present description can be applied because the basic operation is similar.

Embodiments in accordance with the present description were explained with reference to the drawings. However, the present invention is not limited to these embodiments. Cartridge moving in accordance with the present description can be embodied in a manner that includes various improvements, modifications and variations based on the knowledge of those skilled in the art without departing from the scope of the description provided herein.

What is claimed is:

1. A method for a library manager to move a cartridge including a storage medium between library strings using a car able to move within a shuttle connection in a shuttle complex system having a plurality of library strings connected by a plurality of shuttle connections, the method comprising the operations of:
   receiving a plurality of commands from an application, each command including a moving process to move a cartridge between library strings;
   selecting a first command among the plurality of commands to move a first cartridge from a first library string to a specified location in a second library string among a plurality of library strings;
   searching for an available car among the cars in the plurality of shuttle connections;
   searching for the presence of at least one second command among the plurality of commands to move a second cartridge to a specified location in the first library string from another library string including the second library string in which an available car is located;
   selecting, when at least one second command has been found, a second command to move the second cartridge from the library string nearest to the first library string, and moving the second cartridge to the first library string using the car located in the nearest library string;
   executing the moving process corresponding to the first command using the car moved to the location of the first library string; and
   moving the second cartridge moved to the first library string to the specified location in the first library string.

2. The method of claim 1, further comprising executing the moving process corresponding to the second command using the car located in the nearest library string wherein the operation of executing the moving process corresponding to a second command further comprises the operations of:
   said moving the second cartridge to the first library string using the car located in the nearest library string; and
   said moving the second cartridge moved to the first library string to the specified location in the first library string.

3. The method of claim 1, wherein the operation of executing the moving process corresponding to the first command further comprises the operations of:
   moving the first cartridge to the car made available by moving s the second cartridge;
   moving the car carrying the first cartridge to the second library string; and
   moving the first cartridge from the car to the specified location in the second library string.

4. The method of claim 1, wherein the cartridge including a storage medium is a tape cartridge;
   each of the plurality of library strings includes a plurality of tape drives for driving a tape cartridge, and a plurality of slots for accommodating a tape cartridge; and
   the specified location in the first library string is at least one of the location of a tape drive able to drive the second cartridge and the location of a slot for accommodating the second cartridge.

5. The method of claim 1, wherein the cartridge including a storage medium is a tape cartridge;
   each of the plurality of library strings includes a plurality of tape drives for driving a tape cartridge, and a plurality of slots for accommodating a tape cartridge; and
   the specified location in the second library string is at least one of the location of a tape drive able to drive the first cartridge and the location of a slot for accommodating the first cartridge.

6. The method of claim 1, wherein the operation of executing the moving process corresponding to the first command further comprises the operations of:
   moving the first cartridge to the car made available by moving the second cartridge;
   moving the car carrying the first cartridge to the second library string; and
   moving the first cartridge from the car to the specified location in the second library string.

7. The method of claim 6, wherein the cartridge including a storage medium is a tape cartridge;
   each of the plurality of library strings includes a plurality of tape drives for driving a tape cartridge, and a plurality of slots for accommodating a tape cartridge; and
   the operation of moving the second cartridge to the first library string further comprises an operation of moving the second cartridge to a specified slot location in the first library string.

8. The method of claim 7, wherein the operation of moving the second cartridge to the first library string further comprises the operation of moving the second cartridge from the accommodating slot location to at least one of the location of a tape drive able to drive the second cartridge and the location of another slot for accommodating the second cartridge.

9. A system, comprising:
a shuttle complex system having a plurality of shuttle connections, each shuttle connection having a car able to move within the shuttle connection, and a plurality of library strings connected by at least one shuttle connection, each library string having at least one cartridge including a storage medium;
a library manager having storage including software that when executed by the library manager performs operations; and
a storage manager having an application adapted to issue commands to the library manager, each command including a moving process to move a cartridge between library strings;
wherein the library manager operations comprise:
receiving a plurality of commands from the application to move a cartridge between library strings;
selecting a first command among the plurality of commands to move a first cartridge from a first library string to a specified location in a second library string among the plurality of library strings;
searching for an available car among the cars in the plurality of shuttle connections;
searching for the presence of at least one second command among the plurality of commands to move a second cartridge to a specified location in the first library string from another library string including the second library string in which an available car is located;
selecting, when at least one second command has been found, a second command to move the second cartridge from the library string nearest to the first library string, and moving the second cartridge to the first library string using the car located in the nearest library string;
executing the moving process corresponding to the first command using the car moved to the location of the first library string; and
moving the second cartridge moved to the first library string to the specified location in the first library string.

10. The system of claim 9, wherein the operations further comprise executing the moving process corresponding to the second command using the car located in the nearest library string wherein the operation of executing the moving process corresponding to the second command comprises the operations of:
said moving the second cartridge to the first library string using the car located in the nearest library string; and
said moving the second cartridge moved to the first library string to the specified location in the first library string.

11. The system of claim 9, wherein the operation of executing the moving process corresponding to the first command further comprises the operations of:
moving the first cartridge to the car made available by moving the second cartridge;
moving the car carrying the first cartridge to the second library string; and
moving the first cartridge from the car to the specified location in the second library string.

12. The system of claim 9, wherein the cartridge including a storage medium is a tape cartridge;
each of the plurality of library strings includes a plurality of tape drives for driving a tape cartridge, and a plurality of slots for accommodating a tape cartridge; and
the specified location in the first library string is at least one of the location of a tape drive able to drive the second cartridge, and the location of a slot for accommodating the second cartridge.

13. The system of claim 9, wherein the cartridge including a storage medium is a tape cartridge;
each of the plurality of library strings includes a plurality of tape drives for driving a tape cartridge, and a plurality of slots for accommodating a tape cartridge; and
the specified location in the second library string is at least one of the location of a tape drive able to drive the first cartridge and the location of a slot for accommodating the first cartridge.

14. The system of claim 9, wherein the operation of executing the moving process corresponding to the first command further comprises the operations of:
moving the first cartridge to the car made available by moving the second cartridge;
moving the car carrying the first cartridge to the second library string; and
moving the first cartridge from the car to the specified location in the second library string.

15. The system of claim 14, wherein the cartridge including a storage medium is a tape cartridge;
each of the plurality of library strings includes a plurality of tape drives for driving a tape cartridge, and a plurality of slots for accommodating a tape cartridge; and
the operation of moving the second cartridge to the first library string further comprises an operation of moving the second cartridge to a specified slot location in the first library string.

16. The system of claim 15, wherein the operation of moving the second cartridge to the first library string further comprises the operation of moving the second cartridge from the accommodating slot location to at least one of the location of a tape drive able to drive the second cartridge and the location of another slot for accommodating the second cartridge.

17. A software product for use with a shuttle complex system having a plurality of shuttle connections, each shuttle connection having a car able to move within the shuttle connection, and a plurality of library strings connected by at least one shuttle connection, each library string having at least one cartridge including a storage medium, a library manager having storage including software that when executed by the library manager performs operations, and a storage manager having an application adapted to issue commands to the library manager, each command including a moving process to move a cartridge between library strings, wherein the library manager operations comprise:
receiving a plurality of commands from the application to move a cartridge between library strings;
selecting a first command among the plurality of commands to move a first cartridge from a first library string to a specified location in a second library string among the plurality of library strings;
searching for an available car among the cars in the plurality of shuttle connections;
searching for the presence of at least one second command among the plurality of commands to move a second cartridge to a specified location in the first library string from another library string including the second library string in which an available car is located;

selecting, when at least one second command has been found, a second command to move the second cartridge from the library string nearest to the first library string, and moving the second cartridge to the first library string using the car located in the nearest library string;

executing the moving process corresponding to the first command using the car moved to the location of the first library string; and moving the second cartridge moved to the first library string to the specified location in the first library string.

18. The software product of claim 17, wherein the operations further comprise executing the moving process corresponding to the second command using the car located in the nearest library string wherein the operation of executing the moving process corresponding to the second command further comprises the operations of:

said moving the second cartridge to the first library string using the car located in the nearest library string; and said moving the second cartridge moved to the first library string to the specified location in the first library string.

19. The software product of claim 17, wherein the operation of executing the moving process corresponding to the first command further comprises the operations of:

moving the first cartridge to the car made available by moving the second cartridge;

moving the car carrying the first cartridge to the second library string; and moving the first cartridge from the car to the specified location in the second library string.

20. The software product of claim 17, wherein the cartridge including a storage medium is a tape cartridge;

each of the plurality of library strings includes a plurality of tape drives for driving a tape cartridge, and a plurality of slots for accommodating a tape cartridge; and the specified location in the first library string is at least one of the location of a tape drive able to drive the second cartridge, and the location of a slot for accommodating the second cartridge.

21. The software product of claim 17, wherein the cartridge including a storage medium is a tape cartridge;

each of the plurality of library strings includes a plurality of tape drives for driving a tape cartridge, and a plurality of slots for accommodating a tape cartridge; and the specified location in the second library string is at least one of the location of a tape drive able to drive the first cartridge and the location of a slot for accommodating the first cartridge.

22. The software product of claim 17, wherein the operation of executing the moving process corresponding to the first command further comprises the operations of:

moving the first cartridge to the car made available by moving the second cartridge;

moving the car carrying the first cartridge to the second library string; and moving the first cartridge from the car to the specified location in the second library string.

23. The software product of claim 22, wherein the cartridge including a storage medium is a tape cartridge;

each of the plurality of library strings includes a plurality of tape drives for driving a tape cartridge, and a plurality of slots for accommodating a tape cartridge; and the operation of moving the second cartridge to the first library string further comprises an operation of moving the second cartridge to a specified slot location in the first library string.

24. The software product of claim 23, wherein the operation of moving the second cartridge to the first library string further comprises the operation of moving the second cartridge from the accommodating slot location to at least one of the location of a tape drive able to drive the second cartridge and the location of another slot for accommodating the second cartridge.

* * * * *